Figure 1:
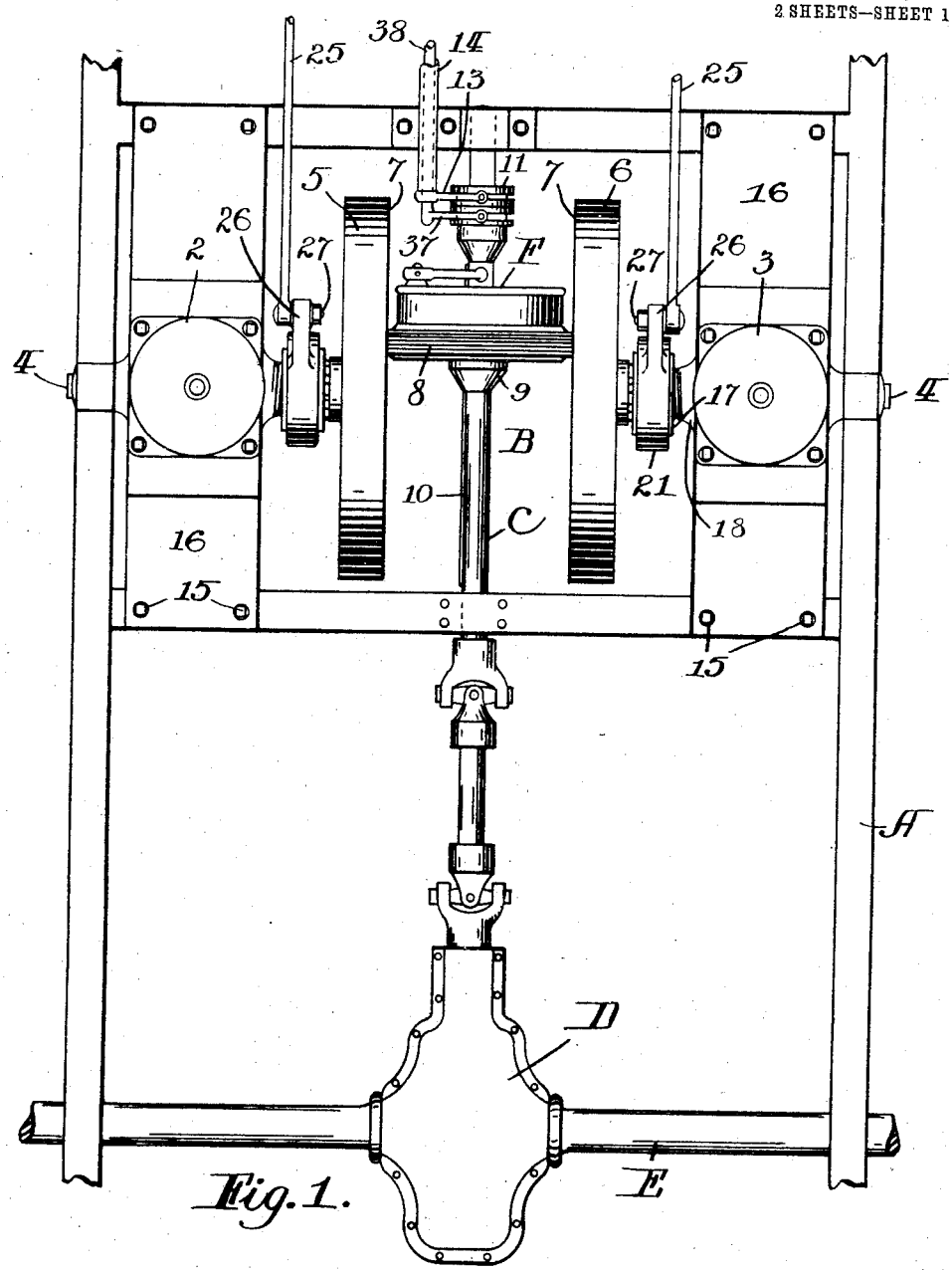

No. 873,903. PATENTED DEC. 17, 1907.
E. SCHMIDT.
TRANSMISSION AND SPEED CHANGING MECHANISM.
APPLICATION FILED OCT. 28, 1905.

2 SHEETS—SHEET 1.

Witnesses:
E. M. Boeak
[signature]

Inventor:
Eugene Schmidt,
by: John E. Stryker
Attorney.

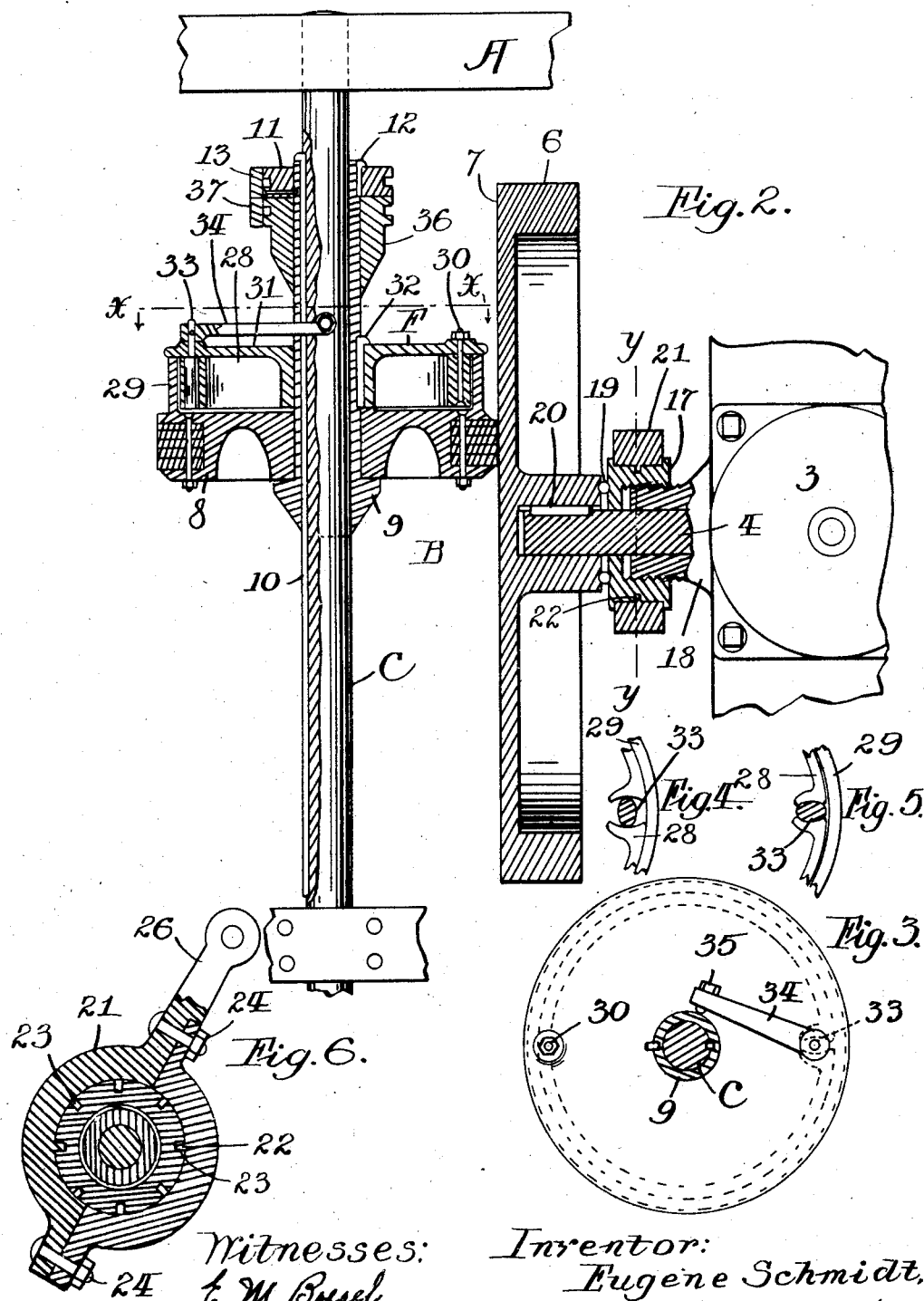

UNITED STATES PATENT OFFICE.

EUGENE SCHMIDT, OF STILLWATER, MINNESOTA.

TRANSMISSION AND SPEED-CHANGING MECHANISM.

No. 873,903.

Specification of Letters Patent.

Patented Dec. 17, 1907.

Application filed October 28, 1905. Serial No. 284,816.

*To all whom it may concern:*

Be it known that I, EUGENE SCHMIDT, a citizen of the United States, residing at Stillwater, in the county of Washington and State of Minnesota, have invented new and useful Transmission and Speed - Changing Mechanism for Automobiles, of which the following is a specification.

My invention relates to improvements in transmission and speed changing mechanism for automobiles. Its primary object is to produce simple, effective and improved mechanism which may be easily operated and adjusted.
Further objects are to prevent loss of power between the engine and differential gears, which are usually carried upon the frame, and to utilize the fly wheels on the engines as part of the transmission mechanism.

In the accompanying drawings forming part of this specification, Figure 1 is a detail plan of an automobile frame, showing my invention; Fig. 2 is a detail horizontal section of part of the transmission and speed changing mechanism; Fig. 3 is an end view, taken on the line x—x, of Fig. 2; Figs. 4 and 5 are detail views, partly in section, of the friction clutch, and Fig. 6 is a sectional detail view, taken on the line y—y, of Fig. 2.

In the drawings A represents the frame of an automobile, B the speed changing mechanism, C the longitudinal drive shaft, D the differential gearing and E the rear drive axle to which the differential gearing is connected.

A pair of gasolene engines 2 and 3 each carry an independent shaft 4, respectively provided with fly wheels 5 and 6, which have oppositely arranged frictional faces 7. Between these faces and in peripheral contact therewith is a frictional drive wheel 8 journaled on a sleeve 9, which is carried on the longitudinal drive shaft C. This sleeve, by the use of a feather 10, is free to slide on the shaft C and is moved longitudinally to adjust the frictional drive wheel radially upon the friction faces of the fly wheels 5 and 6 by means of a collar 11 (which is keyed at 12 on said sleeve), a yoke 13 and a tubular rod 14 (see Fig. 1) leading to any suitable operating handle (not shown).

The engines 2 and 3, which are respectively secured to the frame A by means of bolts 15 passing through their bases 16, have their shafts arranged in alinement, so that the frictional faces of the fly wheels revolve in opposite vertical planes. Each of these fly wheels may be adjusted to frictionally engage the drive wheel 8 by means of an adjusting nut 17 threaded on the neck 18 of the engine frame. The threads on the necks of the engines are respectively right and left hand. A ball bearing 19 located between the inner end of the hub of the fly wheel and the adjacent face of the nut 17 receives the end thrust between these parts.

The adjusting mechanism for the fly wheels is similar on each engine, and the ordinals apply to corresponding parts on each adjusting device. The end of the shaft 4 is provided with a feather 20, and the hub of the fly wheel which each shaft carries is free to slide on said feather. A sectional ring 21 is fastened on the nut 17 by means of pins 22 (see Fig. 6), which engage corresponding recesses 23 in the perimeter of said nut. A series of these recesses is formed in the nut, and the sectional ring may be changed in position on the perimeter thereof in case of wear of the parts by loosening bolts 24 and separating the sections of the ring. An operating rod 25 is connected to the lever 26 on the sectional ring by means of a bolt 27 and may be moved and locked by a suitable handle or quadrant (not shown) to press and hold the frictional faces of the fly wheel it carries against the perimeter of the frictional drive wheel 8. This adjustment of the fly wheels may be made whenever there is any indication of slip between them and the frictional drive wheel, and it is obvious that, by adjusting the pressure equally between them, any strain or load on the horizontal shaft C is eliminated. In this manner the wear of the bearings on the horizontal shaft is reduced.

Other means than those I have shown may be used for adjusting the fly wheel on the end of the engine shaft and locking it in adjusted position, and I do not wish to be understood as limiting myself to the use of the exact construction described.

To throw the drive shaft C into operation, a friction clutch F is connected with the frictional drive wheel 8. This clutch consists of a sectional annulus 28, which is arranged within a rim 29 on the side of the frictional drive wheel. This annulus is pivoted at 30 on a circular plate 31, which is keyed at 32 on the sleeve 9. The adjacent ends of the annulus 28 are concave, as shown in Figs. 4 and 5, and between them is arranged an elliptical shaft 33, which is journaled on the plate 31 and attached to an operating arm 34. The free end of this operating arm carries an adjusting bolt 35, which rides upon the perimeter of the sleeve 9 when the clutch is revolving freely. To throw the clutch into operation, a cone 36, which is free to slide on the sleeve 9, is moved below the bolt 35 and raises the free end of the arm 34. By this means the elliptical shaft 33 is turned from the position shown in Fig. 5 toward the position shown in Fig. 4, and the annulus 28 expanded and caused to frictionally engage the rim 29. The cone 36 is moved by means of a yoke 37 carried by a rod 38 sliding through the tubular rod 14.

In operation the engines 2 and 3 revolve in opposite directions, and their fly wheels cause the frictional drive wheel to revolve continuously on the sleeve 9. To go ahead the sleeve 9 is moved backwardly on the horizontal shaft by means of the tubular rod 14 until the frictional disk crosses the axis of the fly wheels and the cone 36 is moved back by means of the rod 38 until the clutch engages the rim on the frictional drive wheel. To increase the speed of operation, the tubular rod is moved back, thus increasing the distance from the axis of the fly wheels to the point of contact of the frictional drive wheel. To reverse the direction in which the vehicle is caused to move, the frictional drive wheel is returned into the position shown in Fig. 1, in which it appears on the opposite side of the axis of the fly wheels. The clutch is operated in the same manner when the frictional drive wheel is in reversed position as when it is in go-ahead position. When it is desired to adjust the pressure between the perimeter of the frictional drive wheel and the fly wheels the rods 25 are moved forward or backward.

Having described my invention, what I claim as new and desire to protect by Letters Patent, is:—

1. Apparatus of the class set forth, comprising a suitable frame, engines mounted upon said frame, a drive shaft and transmitting mechanism, comprising fly wheels carried by said engines and having frictional drive faces, a frictional drive wheel in continuous peripheral contact with each of said faces, a sleeve feathered and free to slide on said shaft upon which sleeve said frictional drive wheel is journaled, a clutch between said sleeve and frictional drive wheel, means for sliding said sleeve to move said drive wheel across the faces of said fly wheels, and means for throwing said clutch into and out of operation.

2. In a friction gearing, the combination with a driving shaft of a sleeve slidably mounted thereon; means for causing the sleeve to rotate in unison with the shaft, a friction gear rotatively mounted on the sleeve, clutch mechanism mounted on the sleeve and adapted to engage with the friction gear, and a friction disk mounted on a countershaft and adapted to contact with said friction gearing.

3. In a friction gearing, the combination with a driving shaft of a sleeve slidably mounted thereon; means for causing the sleeve to rotate in unison with the shaft, a friction gear rotatively mounted on the sleeve, clutch mechanism mounted on the sleeve and adapted to engage with the friction gear, and friction disks mounted parallel to each other on opposite sides of said friction gear, and means for causing the said friction disks to bear against the periphery of said friction gear.

In testimony whereof I have signed my name to this specification in the presence of two subscribing witnesses.

EUGENE SCHMIDT.

Witnesses:
E. M. BOESEL,
W. H. WILLIAMS.